United States Patent
Kumar et al.

(10) Patent No.: US 10,586,269 B2
(45) Date of Patent: *Mar. 10, 2020

(54) ONLINE CART AND SHOPPING LIST SHARING

(71) Applicant: Walmart Apollo, LLC, Bentonville, AR (US)

(72) Inventors: Vivek Kumar, Bangalore (IN); Preetam Purbia, Bangalore (IN); Vibhor Rastogi, Bangalore (IN); Praveen Deverachetty, Bangalore (IN); Dinesh Amarnath Rao Pise, Bangalore (IN); Lalit Gandotra, Bangalore (IN); Soumya Ranjan Mohanty, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,711

(22) Filed: Oct. 11, 2018

(65) Prior Publication Data

US 2019/0080386 A1 Mar. 14, 2019

Related U.S. Application Data

(63) Continuation of application No. 14/815,164, filed on Jul. 31, 2015, now Pat. No. 10,127,600.

(Continued)

(51) Int. Cl.
*G06Q 30/00* (2012.01)
*G06Q 30/06* (2012.01)

(52) U.S. Cl.
CPC .............. *G06Q 30/0633* (2013.01)

(58) Field of Classification Search
CPC ..................................... G06Q 30/00
See application file for complete search history.

(56) References Cited

U.S. PATENT DOCUMENTS 6,850,899 B1 * 2/2005 Chow ............ G06Q 30/06
705/26.8
6,850,917 B1 2/2005 Hom et al.
(Continued)

FOREIGN PATENT DOCUMENTS

WO 2011049612 A1 4/2011
WO 2012097285 A2 7/2012

OTHER PUBLICATIONS

Miller, Clare, "Retailers Try to Adapt to Device-Hopping Shoppers", New York Times, Dec. 21, 2012. (Year: 2012).
(Continued)

*Primary Examiner* — Mark A Fadok
(74) *Attorney, Agent, or Firm* — McCarter & English, LLP; David R. Burns

(57) ABSTRACT

Systems, methods, and non-transitory computer readable media providing shared online shopping lists and/or carts among users are disclosed. The method includes receiving a primary virtual shopping cart containing related items generated by a first user. A database entry for the primary shopping cart is created and correlated with a shopping cart identifier in response to a user request. The database entry includes one or more keywords associated with the first user of the primary virtual shopping cart. A query is received from a second user, and a list of primary virtual shopping carts is provided to the second user based on relevancy to the query. In response to a request by the second user, the contents of a selected primary virtual shopping cart is duplicated in a secondary virtual shopping cart associated with the second user.

15 Claims, 4 Drawing Sheets

Related U.S. Application Data

(60) Provisional application No. 62/031,430, filed on Jul. 31, 2014.

(56) References Cited

U.S. PATENT DOCUMENTS

| | | | |
|---|---|---|---|
| 6,876,977 B1 | 4/2005 | Marks | |
| 7,542,924 B2* | 6/2009 | Chow | G06Q 30/06 705/26.7 |
| 7,970,661 B1 | 6/2011 | Abraham et al. | |
| 7,996,270 B2 | 8/2011 | Sundaresan | |
| 8,321,290 B2* | 11/2012 | Chow | G06Q 30/06 705/1.1 |
| 8,326,690 B2* | 12/2012 | Dicker | G06Q 30/02 705/14.54 |
| 8,583,507 B2* | 11/2013 | Chow | G06Q 30/06 705/14.23 |
| 9,639,884 B2* | 5/2017 | Chow | G06Q 30/06 |
| 9,785,990 B2* | 10/2017 | Folayan | G06Q 30/0613 |
| 2001/0049636 A1 | 12/2001 | Hudda et al. | |
| 2003/0225632 A1 | 12/2003 | Tong et al. | |
| 2005/0131772 A1* | 6/2005 | Chow | G06Q 30/06 705/26.7 |
| 2006/0122895 A1* | 6/2006 | Abraham | G06Q 30/02 705/26.2 |
| 2007/0239552 A1 | 10/2007 | Sundaresan | |
| 2007/0271147 A1 | 11/2007 | Crespo et al. | |
| 2008/0027824 A1* | 1/2008 | Callaghan | G06Q 30/02 705/26.8 |
| 2008/0189190 A1* | 8/2008 | Ferber | G06Q 30/06 705/26.41 |
| 2009/0018932 A1 | 1/2009 | Evans et al. | |
| 2009/0307108 A1* | 12/2009 | Chow | G06Q 30/06 705/26.1 |
| 2010/0042515 A1 | 2/2010 | Crespo et al. | |
| 2010/0191619 A1* | 7/2010 | Dicker | G06Q 30/02 705/26.1 |
| 2011/0213653 A1 | 9/2011 | Mesaros | |
| 2013/0013439 A1 | 1/2013 | Smullen et al. | |
| 2013/0018745 A1 | 1/2013 | Winslade et al. | |
| 2013/0041781 A1 | 2/2013 | Freydberg | |
| 2013/0054357 A1 | 2/2013 | Mager et al. | |
| 2013/0103541 A1* | 4/2013 | Chow | G06Q 30/06 705/26.8 |
| 2013/0317899 A1* | 11/2013 | Shiely | G06Q 30/0185 705/14.26 |
| 2013/0325568 A1* | 12/2013 | Mangalvedkar | G06Q 30/0269 705/14.4 |
| 2014/0156353 A1* | 6/2014 | Urbanski | G06Q 50/16 705/7.35 |
| 2014/0172527 A1 | 6/2014 | Bezos et al. | |
| 2014/0195370 A1 | 7/2014 | Devasia et al. | |
| 2014/0201031 A1* | 7/2014 | Brooks | G06Q 30/0633 705/26.8 |
| 2014/0222617 A1* | 8/2014 | Chow | G06Q 30/06 705/26.8 |
| 2015/0026007 A1* | 1/2015 | Mangalvedkar | G06Q 30/0633 705/26.8 |
| 2015/0058165 A1* | 2/2015 | Folayan | G06Q 30/0613 705/26.41 |
| 2016/0155169 A9* | 6/2016 | Folayan | G06Q 30/0613 705/26.41 |

OTHER PUBLICATIONS

Sharing your cart is just a click away: Fisher Scientific now offers and easy way for government scientists to communicate the products they with to buy to procurement personnel, Fisher Scientific, 2013.

Connecting Your Moible Shopping Cart to the Internet-of-Things, vol. 7272 of the series Lecture Notes in Computer Science, abstract only, obtained Oct. 30, 2015.

Shopping Cart Interactive Program (SCIP), vol. 6764 of the series Lecture Notes in Computer Science, abstract only, obtained Oct. 30, 2015.

U.S. Appl. No. 14/815,164, filed Jul. 31, 2015, Vivek Kumar et al.

* cited by examiner

ONLINE CART AND SHOPPING LIST SHARING

RELATED APPLICATIONS

This application is a continuation application of U.S. patent application Ser. No. 14/815,164 filed on Jul. 31, 2015, which claims priority to U.S. Provisional Application Ser. No. 62/013,430 filed on Jul. 31, 2014, the disclosures of which are incorporated by reference herein in their entirety.

BACKGROUND

In existing offline retail store e-commerce web sites, a customer does not typically have flexibility to share their cart with family, friends, or others having similar needs. Currently, in both offline and online modes, a customer can typically only show or share a payment receipt containing purchased items information to others.

Even after having a payment receipt, other customers who also need the same set of items have to either visit a retail store or login online to pick products from shelves or from an online catalogue for shopping. Just sharing a payment receipt with others is not always helpful to other customers in shopping. To make it worse, most customers do not like to share lists with friends or at least with larger groups due to privacy concerns.

Accordingly, there is a need to provide customers an effective way to share shopping carts and/or lists. There is a further need for a method of generating shopping lists and carts for online shopping that can be shared among persons with similar shopping needs.

SUMMARY

Embodiments described herein provide a system and method for advantageously sharing saved virtual shopping carts. The system and method provide for a computerized improvement to the functioning of a computer system by storing populated virtual shopping carts and making them accessible to users for automatic purchase of the entire cart. The functionality of automatically purchasing an all the items within a pre-populated virtual cart reduces the burden on the servers and database(s) by reducing the number of queries performed to search individual products and improves the speed and efficiency of the system by reducing the burden on the servers and databases.

Exemplary embodiments described herein provide for a method for creating and replicating database entries and associating created and replicated database entries with different users. The method includes receiving, by a database from a server, a primary virtual shopping cart containing items generated; creating, by the database, a database entry for the primary shopping cart and correlating it with a shopping cart identifier in response to a user request. The database entry includes one or more keywords associated with the first user or the primary virtual shopping cart and access permissions. The method also includes receiving, by the database from the server, a query for saved primary virtual shopping carts; transmitting, to the server from the database, primary virtual shopping carts returned in response to the query; ranking, by the server, the returned primary virtual shopping carts in a list based on pre-determined criteria; transmitting to a user computing device having a display operatively coupled thereto, the ranked list of primary virtual shopping carts based on the query; and duplicating, on the server, the contents of a selected primary virtual shopping cart in a secondary virtual shopping cart.

Exemplary embodiments of the present disclosure provide for system of creating and replication database entries and associating created and replicated database entries with different users. The system includes a server; a computing device; a display operatively coupled to the computing device; and a database. The database (i) receives, from the server, a primary virtual shopping cart containing items; (ii) creates a database entry for the primary virtual shopping cart and correlating it with a shopping cart identifier in response to a user request; (iii) receives, from the server, a query for saved primary virtual shopping carts and user information; and (iv) transmits, to the server, primary virtual shopping carts returned from the query. The server (i) ranks the returned primary virtual shopping carts based on pre-determined criteria; (ii) transmits, to the computing device, a list of the ranked primary virtual shopping carts; and (iii) duplicates the contents of a selected primary virtual shopping cart in secondary virtual shopping cart. The database entry includes one or more keywords associated with the first user or the primary virtual shopping cart and access permissions.

In exemplary embodiments, at least one of the primary virtual shopping carts is provided with an expiration date after which the at least one primary virtual shopping cart will no longer be available for duplication into a secondary virtual shopping cart or appear in search results.

In exemplary embodiments, wherein the primary virtual shopping carts are associated with one or more events, uses, or activities.

In exemplary embodiments, wherein the query is a search query using keywords.

In exemplary embodiments, wherein the query is a shopping cart ID query.

In exemplary embodiments, wherein the shopping cart ID query is made by scanning or image capturing at least a portion of a purchase receipt.

In exemplary embodiments, wherein the primary virtual shopping carts may be edited by a plurality of users prior to being copied into a secondary virtual shopping cart.

In exemplary embodiments, wherein the access permission will allow or deny accessibility to the primary virtual shopping cart.

Any combination and/or permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Illustrative embodiments are shown by way of example in the accompanying drawings and should not be considered as a limitation of the present disclosure.

DETAILED DESCRIPTION OF EXEMPLARY EMBODIMENTS

Described in detail herein are methods, and systems associated with creating virtual shopping carts pre-populated with items, saving the virtual shopping carts and making the virtual shopping carts accessible to users. In exemplary embodiments, a primary user may populate a shopping cart to include various items, the primary user may assign a name to the shopping cart, associate keywords with the shopping cart and save the virtual shopping cart. In exemplary embodiments, a secondary user may access the saved virtual shopping cart. In exemplary embodiments, the secondary user can, save the virtual shopping cart, re-share the virtual shopping cart, and add the items from the saved virtual shopping cart into their own personal virtual shopping cart.

The following description is presented to enable any person skilled in the art to creating virtual shopping carts pre-populated with items, saving the virtual shopping carts and making the virtual shopping carts accessible to users. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that example embodiments of the present disclosure may be practiced without the use of these specific details. In other instances, well-known structures and processes are shown in block diagram form in order not to obscure the description of example embodiments with unnecessary detail. Thus, the present disclosure is not intended to be limited to the embodiments shown, but is to be accorded the widest scope consistent with the principles and features disclosed herein.

Figure 1:
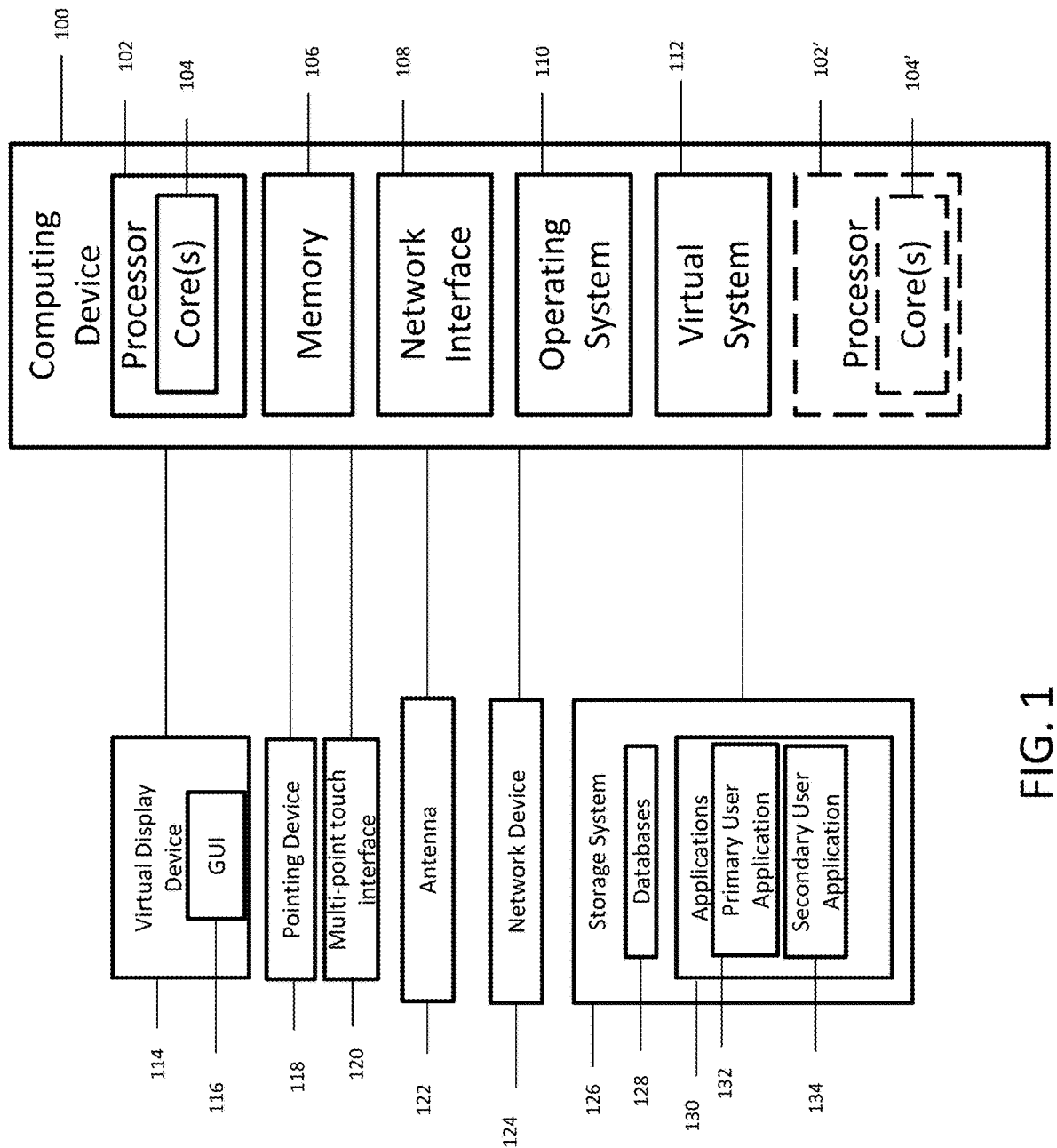
FIG. 1 is a block diagram of an example computing device used to create, save and access saved virtual shopping carts.

FIG. 1 is a block diagram of an example computing device 100 that may be used to implement exemplary operations of the creating orders by the primary and secondary user. The computing device 100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 106 included in the computing system 100 may store computer-readable and computer-executable instructions or software for implementing exemplary operations of the computing device. The computing device 100 also includes configurable and/or programmable processor 102 and associated core(s) 104, and optionally, one or more additional configurable and/or programmable processor(s) 102' and associated core(s) 104' (for example, in the case of computer systems having multiple processors/cores), for executing computer-readable and computer-executable instructions or software stored in the memory 106 and other programs for controlling cashier station 100 components operatively coupled to the computing system 100. Processor 102 and processor(s) 102' may each be a single core processor or multiple core (104 and 204') processor.

Virtualization may be employed in the computing system 100 so that infrastructure and resources in the computing system 100 may be shared dynamically. A virtual machine 112 may be provided to handle a process running on multiple processors so that the process appears to be using only one computing resource rather than multiple computing resources. Multiple virtual machines may also be used with one processor.

Memory 106 may include a computer system memory or random access memory, such as DRAM, SRAM, EDO RAM, and the like. Memory 106 may include other types of memory as well, or combinations thereof.

A user may interact with the computing system 100 through a visual display device 114, such as a computer monitor, which may display one or more graphical user interfaces 116, multi touch interface 120, and a pointing device 118.

The computing device 100 may also include one or more storage devices 126, such as a hard-drive, CD-ROM, or other computer readable media, for storing data and computer-readable instructions and/or software that implement exemplary of the computing device 100 (e.g., applications 130 including a primary user application 132, a secondary user application 134). The execution of the primary user application 132 by the processor 102 allows a user to create a virtual shopping carts populated with multiple items. The execution of the secondary user application 134 by the processor 102 allows a user to replicate or duplicate pre-populated virtual shopping carts. Exemplary storage device 126 may also store one or more databases 128 for storing any suitable information required to implement exemplary embodiments. For example, exemplary storage device 126 can store one or more databases 128 for storing information such as saved pre-populated virtual shopping carts and customer information. The databases may be updated manually or automatically at any suitable time to add, delete, and/or update one or more data items in the databases.

The computing device 100 can include a network interface 108 configured to interface via one or more network devices 124 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 122 to facilitate wireless communication (e.g., via the network interface) between the computing device 100 and a network. The network interface 108 may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

The computing device 100 may run any operating system 110, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 100 and performing the operations described herein. In exemplary embodiments, the operating system 110 may be run in native mode or emulated mode. In an exemplary embodiment, the operating system 110 may be run on one or more cloud machine instances.

In exemplary embodiments described herein, upon execution of the primary user application 132 by the processor 102, the processor 102 can provide one or more graphical user interfaces through which the primary user may create a virtual shopping cart populated with multiple items in response to selection of items via the graphical user interface. In exemplary embodiments, the primary user application 132 may provide one or more graphical user interfaces in which the primary user may assign a unique name to the virtual shopping cart and may assign keywords to the virtual shopping cart associated with the items in items in the virtual shopping cart. In exemplary embodiments, the primary user application 132 may provide one or more graphical user interfaces that allow the primary user to share a link for a saved virtual shopping cart using various platforms. In exemplary embodiments, the primary user application 132 may provide one or more graphical user interfaces in which the primary user may make the saved virtual shopping cart accessible to the public or make the virtual shopping cart private only giving access to users with the link. In exemplary embodiments, the primary user application 132 may provide one or more graphical user interfaces in which the primary user may set an expiration date on the link to the saved virtual shopping cart.

In exemplary embodiments, upon execution of the secondary user application 134 by the processor 102 can provide one or more graphical user interfaces through which the secondary user may access a saved virtual shopping cart using a provided link or searching for the saved virtual shopping cart. In exemplary embodiments, the secondary user application 134 by the processor 102 can provide one or more graphical user interfaces through which the secondary user may add the items in the saved virtual shopping cart to their personal virtual shopping cart. In exemplary embodiments, the secondary user application 134 by the processor 102 can provide one or more graphical user interfaces through which the secondary user may save the items in the virtual shopping cart in a list only accessible to the secondary user. In exemplary embodiments, the secondary user application 134 by the processor 102 can provide one or more graphical user interfaces through which the secondary user may re-share the saved virtual shopping cart using various platforms.

Figure 2:
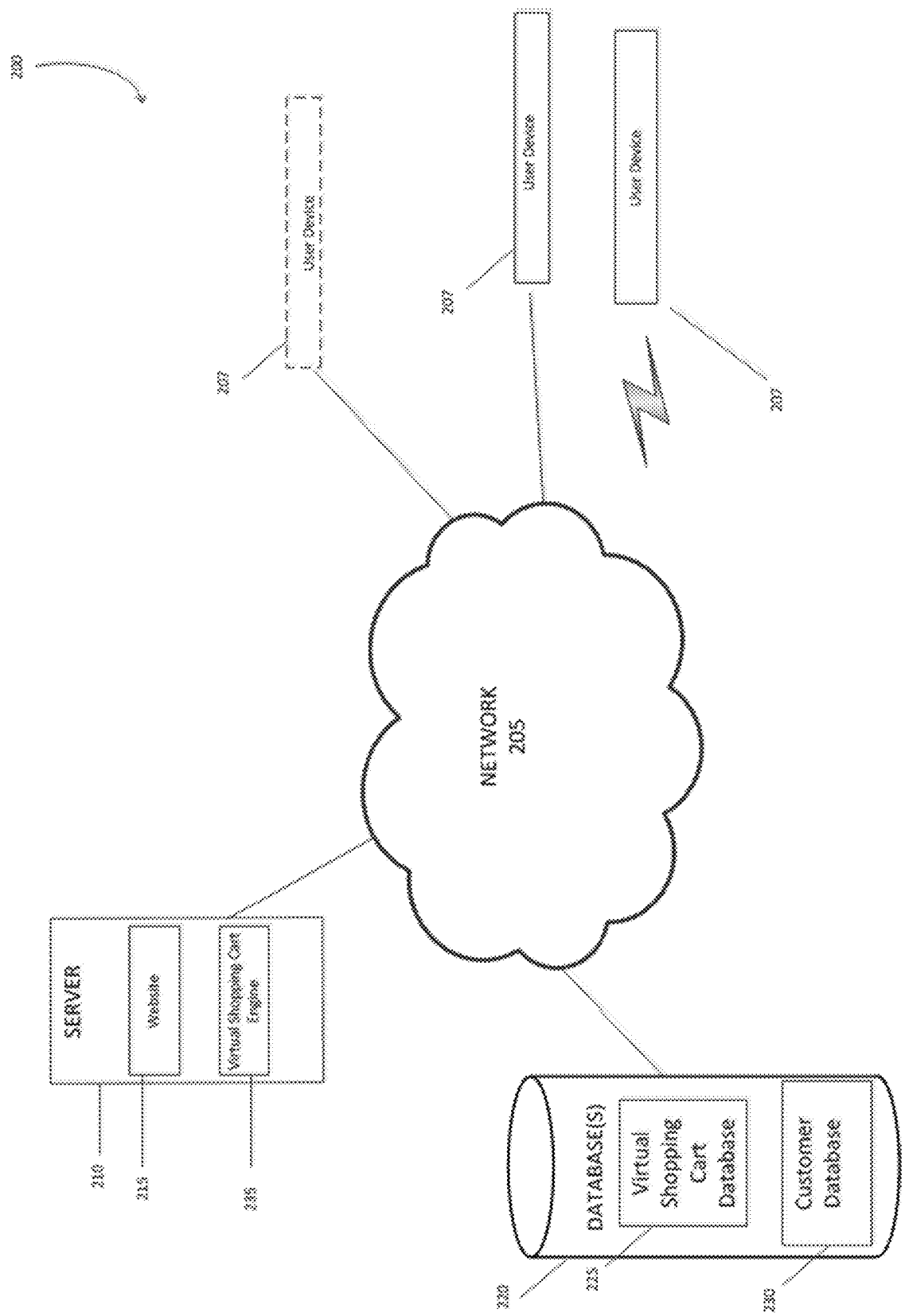
FIG. 2 illustrates an exemplary environment through which the computing device communicate with other devices.

FIG. 2 illustrates a network diagram depicting a system 200 for creating and replicating database entries in the form of pre-populated virtual shopping carts. The system 200 can include a network 205, user computing devices 207, a server 210, and the database(s) 220. Each of the user computing devices 207, the server 210, and the database(s) 220 is in communication with the network 205.

In an example embodiment, one or more portions of network 205 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The user computing devices 207 can be implemented as an embodiment of the computing device 100 (shown in FIG. 1) and may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like. The user computing devices 207 may be used by the primary user to create, save and share virtual shopping carts (e.g., upon execution of a primary user application 132 by the processor 102). In other embodiments, the computing device 207 can be used by the secondary user to access saved virtual shopping carts (e.g., upon execution of a secondary user application 134 by the processor 102). The user computing devices 207 can include one or more components show in FIG. 1.

The user computing devices 207 may also include various external or peripheral devices to aid in performing transactions such as creating, saving and sharing virtual shopping carts by a primary shopper. In exemplary embodiments, the user computing devices 207 may also include various external or peripheral devices to aid in performing transactions such as accessing, re-sharing, saving and purchasing items in the saved virtual shopping cart by a secondary user. Examples of peripheral devices include, but are not limited to, monitors, touch-screen monitors, clicking devices (e.g., mouse), input devices (e.g., keyboard), receipt printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like.

The user computing devices 207 may connect to network 205 via a wired or wireless connection. The user computing devices 207 may include one or more applications or systems (e.g., the primary user application 132, the secondary user application). In an example embodiment, the user computing devices 207 may perform all the functionalities described herein. In some embodiments, the user computing devices 207 can include a client side application, such as a web browser, that allows the user computing devices to communicate and interact with applications hosted by the server 210. For example, the server 210 can host the primary user application 132 and/or the secondary user application 134, and the user computing devices 207 can execute the client-side application to interact with the applications 132 an 134.

In some embodiments, the user computing devices 207 may perform some of the functionalities, and server 210 performs the other functionalities described herein. For example, the user computing devices 207 may generate the user interface in response to execution of the primary user application 132 and/or the secondary user application 134. In an another embodiment the server 210 may generate a user interface in response to execution of the primary user application 132 and/or the secondary user application 134. In exemplary embodiments, the graphical user interface for the primary user application includes including a graphical representation of creating, saving, and sharing, a primary virtual shopping cart. In exemplary embodiments the graphical user interface for a secondary user application includes, searching and accessing virtual shopping carts.

In exemplary embodiments, the server 210 may query the databases to retrieve saved virtual shopping carts. The server 210 may host an online store 215 and a virtual shopping cart engine 235. The virtual shopping cart engine 235 may communicate with the database 220 to retrieve saved virtual shopping carts and user shopping preferences. In exemplary embodiments, the primary user application 132 and secondary user application 134 may interface with the online-store 215 to allow the primary user and secondary user to create, save, share, search and access virtual shopping carts.

The database 220 may store information/data, as described herein. For example, the database 220 may include a virtual shopping carts database 225 and a customer database 225. In exemplary embodiments the virtual shopping carts database 225 may hold all the saved virtual shopping carts including the items included in the virtual shopping carts. In exemplary embodiments, a primary user, using the primary user application 132, may populate a virtual shopping cart with items and save the shopping cart in the virtual shopping cart database 225. In exemplary embodiments, the primary user, using the primary user application 132, may assign a name to the virtual shopping cart along with keywords associated with the items in the virtual shopping cart. The processor of a user computing device may transmit instructions to the server 210 to save the the virtual shopping cart name and keywords along with the items in the virtual shopping cart database 225. In exemplary embodiments, the primary user, using the primary user application, may set security permissions for which users may access the virtual shopping cart. The processor of the server may instruct the server to save the security permissions associated with the virtual shopping cart in the virtual shopping cart database 225. In exemplary embodiments, the primary user, using the primary user application, may set an expiration date for the virtual shopping cart. In response to receipt of the expiration date by the server, the processor of the server may instruct the server 210 to save the expiration date associated with the virtual shopping cart in the virtual shopping cart database 225.

In exemplary embodiments, processor of the server may receive a request to access a saved shopping virtual shopping cart in response to the secondary user's interaction with the graphical user interface of the secondary user application 134. The processor may instruct the server 210 to retrieve the requested virtual shopping cart from the virtual shopping cart database 225. The request transmitted by the user computer device may include may include the user information of the user attempting to access the saved virtual shopping cart via the server 201. The server 210 may query the virtual shopping cart database 225 to retrieve the saved virtual shopping cart. In exemplary embodiments, the virtual shopping cart database 225 may store security information regarding access to the saved virtual shopping cart. The virtual shopping cart 225 may verify whether a user is able to access the saved virtual shopping cart based comparison of the user information received from the server and security information stored with the virtual shopping cart. In exemplary embodiments, the processor 102 may receive a search request in response to secondary user's interaction with the secondary user application 134. The server 210 can search for saved virtual shopping carts based on search terms and user information transmitted to the server by the user computing device. The server 210 may query the virtual shopping cart database 225 based on the search terms and virtual shopping cart database 225 may retrieve the relevant saved virtual shopping carts. In exemplary embodiments, the database 220 may query the customer database 230 using the user information to retrieve shopping preferences and previously accessed virtual shopping carts. The database 220 may transmit the relevant virtual shopping carts and customer information to the server 210. The virtual shopping cart engine 235 in the server 210 may rank the received virtual shopping carts based on the received customer information. The server 210 can duplicate the contents of a selected primary virtual shopping cart in the database 220 in response to user input and can associate the duplicated prepopulated selected virtual shopping cart with a secondary virtual shopping cart associated with the secondary user.

Each of the server 210 and database(s) 220 is connected to the network 205 via a wired connection. Alternatively, one or more of the server 210 and databases 220 may be connected to the network 205 via a wireless connection. Server 210 comprises one or more computers or processors configured to communicate with computing device 100 and/or the database(s) 220, via network 205. Server 210 hosts one or more applications or websites accessed by the computing device 100 and/or facilitates access to the content of database(s) 220. Server 210 also may include online-store website 215 described herein. Database(s) 220 comprise one or more storage devices for storing data and/or instructions (or code) for use by server 210, and/or the computing device 100. Database(s) 220 and server 210 may be located at one or more geographically distributed locations from each other or from the computing device 100. Alternatively, database(s) 220 may be included within server 210.

Figure 3:
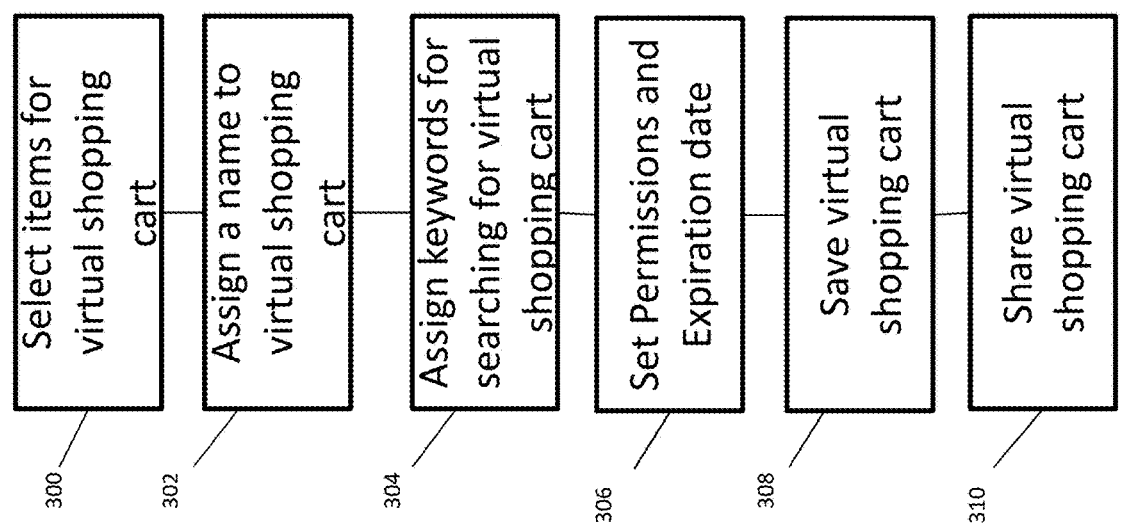
FIG. 3 is a flowchart illustrating the process of creating, saving and sharing the virtual shopping cart according to an exemplary embodiment.

FIG. 3 illustrates the process of creating, saving and sharing entries in a database in the form of a virtual shopping cart by a primary user, using a primary user application 132 by a processor of a server in response to an interaction with a user computing device receiving inputs from a user, according to an exemplary embodiment. In exemplary embodiments, in operation 300, the processor receives a selection of items to populate the virtual shopping cart in response to a primary user interacting with a graphical user interface operatively coupled with the processor. In exemplary embodiments, the virtual shopping cart can be populated in a physical store (e.g., at a point-of-sale terminal including an embodiment of the computing device 100 shown in FIG. 1) by or on-behalf of a primary user. In another embodiment, the primary virtual shopping can be created on a website hosting the online store by a primary user or on behalf of a primary user (e.g., a user device can access the server).

In operation 302, the primary user, via the primary user application 132, may assign a name to the virtual shopping cart. In exemplary embodiments, the server 210 receives a name identifying the created virtual shopping cart in response to primary user's interaction with the user interface via the user computing device. The server 210 can store the name identifying the virtual shopping cart along with the virtual shopping cart items in the virtual shopping cart database 225.

In operation 304, the primary user may assign keywords to the virtual shopping cart, via the primary user application 132. In exemplary embodiments, the server 210 receives the keyword associated with the created virtual shopping cart in response to primary user's interaction with the user interface via the user computer device. The server 210 can store the keywords associated the virtual shopping cart along with the virtual shopping cart items in the virtual shopping cart database 225. In exemplary embodiments, the keywords may be associated with the items populated in the virtual shopping cart. In other embodiments, the keywords may be associated with the primary user.

In operation 306, the primary user may set permissions and an expiration date for the virtual shopping cart, via the primary user application 132. In exemplary embodiments, the permissions may control the accessibility of the virtual shopping cart for other users. In exemplary embodiments, the virtual cart may be provided with an expiration date after which it will no longer appear in search results or be accessible in response to clicking on a link previously associated with the cart. In exemplary embodiments, the server 210 receives the permissions and expiration date associated with the created virtual shopping cart in response to primary user's interaction with the user interface via the user computing device. The server 210 can store the permissions and keywords associated the virtual shopping cart along with the virtual shopping cart items in the virtual shopping cart database 225.

In operation 308, the virtual cart can be stored in the database by the server 210 via the primary user application 132 in response instructions received from the user computer device that are generated in response to user interaction with the user computing device. In exemplary embodiments, the server 210 can create a database entry for the primary shopping in the virtual shopping cart database 225 based on user inputs received via the user computing device. The database entry may include the name, one or more keywords associated with the primary user or with the virtual shopping cart, the items populated in the shopping cart permission settings and an expiration date for the virtual shopping cart.

In operation 310, the primary user may share the virtual shopping cart with other users using various different platforms, via the primary user application 132. In exemplary embodiments, the server 210 may receive a request to share the saved virtual shopping cart in response to the primary user's interaction with the interface. In exemplary embodiments, the virtual shopping cart may be shared among a group via email, SMS, MMS, social networking sites like Facebook, blogs, etc. In exemplary embodiments, a group of sharing options may be provided via a graphical user interface where each button in the graphical user interface corresponds to a sharing option. In exemplary embodiments, upon selecting a sharing option, a shared cart page will be provided to allow the user to make edits to the quantity and types of products, prompt the user to login to a relevant third-party service such as Twitter, Blogger, or Facebook, and request the user provide a name for the cart to be shared. Once this information is provided, the cart may be stored in a database and provided a unique identifier. A URL may be generated and provided as a link to retrieve the shared cart from the database by a user.

Figure 4:
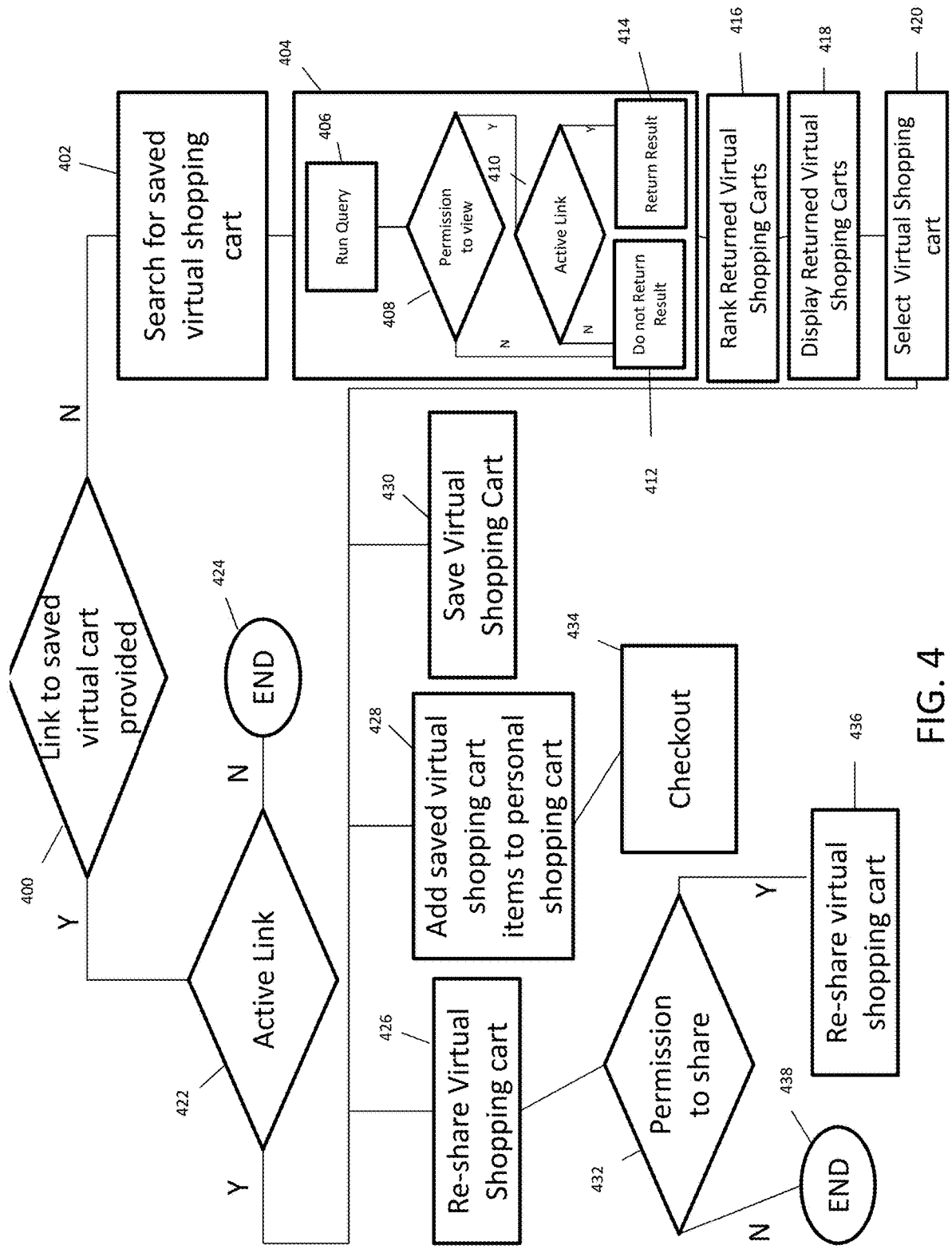
FIG. 4 is a flowchart illustrating the process of accessing the saved virtual shopping cart according to an exemplary embodiment.

FIG. 4 illustrates an exemplary process for a secondary user to access, re-share, replicate, save, or purchase items in a saved virtual cart via a secondary user application 134 executed by the server 210. In operation 400, the server 210 determines, whether a secondary user has been provided a URL link to a saved virtual shopping cart. In operation 402, if the secondary user does not have the link, the server may receive a search request for saved virtual shopping carts, in response to a secondary user's interaction with the user interface via the user computing device. In exemplary embodiments, searches may be performed by title, primary user, or cart contents. The server 210 can receive the search request and secondary user information from the user computing device in response to user inputs at the user computing device. The virtual shopping cart machine 235 in the server 210 will communicate the search request and user information to the database 220.

In operation 404, the database may run a query based on the search words entered by the secondary user. In operation 406, the query may be run against the virtual shopping cart database. In operation 408, the database may determine if the secondary user has permission to access a saved virtual shopping cart. In exemplary embodiments, private virtual shopping carts will not appear in search results or be sharable beyond those secondary shoppers identified by the primary shopper. If the virtual shopping cart is determined to be private and the secondary user does not have access to the virtual shopping cart the virtual shopping cart is not returned in the query, in operation 412. In some embodiments, some virtual shopping carts may include delegated editing permissions so that a group of users can collaborate on selecting the contents of the shared cart. In operation 410, if the secondary user does have permission to access the virtual shopping cart a determination is made to see if the virtual shopping cart is still active. The virtual shopping cart may be provided with an expiration date after which it will no longer appear in search results. The virtual shopping cart will not be returned in the query if the expiration date has passed, in operation 412. If the virtual shopping cart is still active the virtual shopping cart result will be returned in the query.

In operation 416, the returned virtual shopping carts from the query may be ranked by the server 210. The virtual shopping cart machine 235 may rank the returned virtual shopping carts in based on a variety of factors. In exemplary embodiments, the factors may include the popularity of the shared cart based on how many people have copied, re-shared, replicated, or subscribed to it; the identity and/or location of the primary user who created the cart; and the identity and/or location of the secondary user requesting the search results or viewing the pane.

In operation 418, the search results are transmitted from the server to the user computing device and are displayed for the secondary user, via the display of the user computing device. In exemplary embodiments, the display 116 of the user computing device displays a list of links to relevant shared carts. In operation 420, the processor of the user computing device may receive a request to access a link to a virtual shopping cart displayed in the list of links in response to a secondary user interacting with the list of links on the user interface. The user computing device can transmit the selection to the server, which can open or redirect a browser or other application window or mobile app in communication with the online shopping site. In exemplary embodiments, the server may receive a request in response to the secondary user interacting with the user interface to replicate the selected virtual shopping cart by populating the secondary user's personal virtual shopping cart with the items in the accessed virtual shopping cart, re-share the link, and/or save the items in the virtual shopping cart.

In operation 426, the secondary user, using the secondary user application 134 can re-share the link to the accessed virtual shopping cart. The processor 102 may receive a request to re-share the link of the virtual shopping cart in response to secondary user's interaction with the user interface. The processor 102 will transmit the request to re-share to the server 210. In exemplary embodiments, re-sharing could simply further distribution of the original virtual shopping cart or allow for modification of the name and/or contents of the virtual shopping cart before re-sharing and present it as a new shared cart. In operation 428, the server 210 will query the virtual cart database 225 to determine if the secondary user has the permission to further share the virtual shopping cart. In operation 436, if the server determines the secondary user has permission to re-share the virtual shopping cart, the processor may transmit a request to the server 210 to re-share the link using the secondary user's social network, email contacts, or other channel for sharing a link to the virtual shopping cart.

In operation 428, the secondary user, using the accessed user application 134, can add the items from the accessed virtual shopping cart into the secondary user's own personal shopping cart. The server may receive a request to add items from accessed virtual shopping cart to the secondary user's personal virtual shopping cart to replicate or duplicate the accessed virtual shopping cart in response to secondary user's interaction with the user interface. The server 210 may generate a confirmation window the secondary shopper to confirm the addition of shared cart items to their own shopping cart. In operation, a secondary user, using the secondary user application 134, may checkout with the items added from the accessed virtual shopping cart.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A method of creating database entries storing and accessing a subset of selected items, the method comprising:
   receiving, by a server, a primary virtual shopping cart containing items;
   creating, by the server, a first set of database entries in the database for the primary virtual shopping cart;
   correlating, via the server, the primary virtual shopping cart with a unique identifier to uniquely identify the primary virtual shopping cart;
   generating a Uniform Resource Locator (URL) link, the URL link associated with the primary virtual shopping cart, wherein the URL link has a specified expiration date; receiving, by the server, a selection of the URL link;
   verifying, by the server, the URL link associated with the primary virtual shopping cart is active based on the expiration date associated with the URL link;
   in response to verifying the URL link, automatically duplicating the first set of database entries for the primary virtual shopping cart to create a second set of database entries in the database for a secondary virtual shopping cart.

2. The method of claim 1, further comprising:
   receiving, via the server, a request to transmit the URL link associated with the primary virtual shopping cart;
   confirming, via the server, permissions associated with the primary virtual shopping cart for transmitting the URL link; and
   in response to confirming, via the server, permissions associated with the primary virtual shopping cart for transmitting the URL link, transmitting the URL link, via a communications channel.

3. The method of claim 1, wherein after the expiration date the primary virtual shopping cart will no longer be available for duplication into the secondary virtual shopping cart.

4. The method of claim 1, wherein the one or more virtual shopping carts may be associated with one or more events, uses, or activities.

5. The method of claim 1, further comprising receiving, via the server, the selection of the URL link in response to scanning or image capturing at least a portion of a purchase receipt.

6. The method of claim 1, wherein the primary virtual shopping cart may be edited by a plurality of users prior to being copied into the secondary virtual shopping cart.

7. The method of claim 1, wherein an access permission associated with the primary virtual shopping cart will allow or deny accessibility to the primary virtual shopping cart.

8. A system of creating database entries storing and accessing a subset of selected items, the method comprising:
   a database; a computing device;
   a display operatively coupled to the computing device;
   a server, the server (i) receives a primary virtual shopping cart containing items; and (ii) creates one or more database entries in the database for the primary shopping cart (iii) correlate the primary virtual shopping cart with a unique identifier to uniquely identify the primary virtual shopping cart, (iv) generates the URL link associated with the primary virtual shopping cart, wherein the URL link has a specified expiration date, (v) receives a selection of a URL link associated with the primary virtual shopping cart, (vi) verifies the URL link associated with the primary virtual shopping cart is active based on the expiration date associated with the URL link, (iv) in response to verifying the URL link, automatically duplicates the first set of database entries for the primary virtual shopping cart to create a second set of database entries in the database for a secondary virtual shopping cart.

9. The system of claim 8, wherein the server is further configured to:
   receive a request to transmit the URL link associated with the primary virtual shopping cart;
   confirm permissions associated with the primary virtual shopping cart for transmitting the URL link; and
   in response to confirming permissions associated with the primary virtual shopping cart for transmit the URL link, transmitting the URL link, via a communications channel.

10. The system of claim 8, wherein after the expiration date the primary virtual shopping cart will no longer be available for duplication into the secondary virtual shopping cart or appear in search results.

11. The system of claim 8, wherein the one or more virtual shopping carts may be associated with one or more events, uses, or activities.

12. The system of claim 8, wherein the selection of the URL link is made by scanning or image capturing at least a portion of a purchase receipt.

13. The system of claim 8, wherein the primary virtual shopping cart may be edited by a plurality of users prior to being copied into a secondary virtual shopping cart.

14. The system of claim 8, wherein an access permission associated with the primary virtual shopping cart will allow or deny accessibility to the primary virtual shopping cart.

15. A non-transitory computer-readable medium storing instructions for creating database entries storing and accessing a subset of selected items, wherein execution of the instructions by a processor causes the processor to:
   receive, by a server, a primary virtual shopping cart containing items; create, by the server, a first set of database entries in the database for the primary virtual shopping cart;
   correlate, via the server, the primary virtual shopping cart with a unique identifier to uniquely identify the primary virtual shopping cart;
   generate a Uniform Resource Locator (URL) link, the URL link associated with the primary virtual shopping cart, wherein the URL link has a specified expiration date; receive, by the server, a selection of the URL link;
   verify, by the server, the URL link associated with the primary virtual shopping cart is active based on the expiration date associated with the URL link;
   in response to verifying the URL link, automatically duplicate the first set of database entries for the primary virtual shopping cart to create a second set of database entries in the database for a secondary virtual shopping cart.

\* \* \* \* \*